United States Patent
McMillen

(10) Patent No.: US 7,052,087 B2
(45) Date of Patent: May 30, 2006

(54) METHOD AND APPARATUS FOR A SCISSORS ERGONOMIC SUPPORT

(75) Inventor: Robert McMillen, Tecumseh (CA)

(73) Assignee: L&P Property Management Company, South Gate, CA (US)

( * ) Notice: Subject to any disclaimer, the term of this patent is extended or adjusted under 35 U.S.C. 154(b) by 135 days.

(21) Appl. No.: 10/315,320

(22) Filed: Dec. 9, 2002

(65) Prior Publication Data

US 2004/0108760 A1 Jun. 10, 2004

(51) Int. Cl.
*A47C 3/025* (2006.01)

(52) U.S. Cl. .................. 297/284.4; 297/284.4
(58) Field of Classification Search ............ 297/284.4, 297/284.11, 409, 406, 407, 284; 248/421
See application file for complete search history.

(56) References Cited

U.S. PATENT DOCUMENTS

| | | | |
|---|---|---|---|
| 1,182,854 A | 5/1917 | Poler | |
| 2,756,809 A | 7/1956 | Endresen | 155/182 |
| 2,843,195 A | 7/1958 | Barvaeus | 155/182 |
| 2,942,651 A | 6/1960 | Binding | 155/131 |
| 3,378,299 A | 4/1968 | Sandor | 297/284 |
| 3,490,084 A | 1/1970 | Schuster | 5/351 |
| 3,492,768 A | 2/1970 | Schuster | 52/98 |
| 3,724,144 A | 4/1973 | Schuster | 52/108 |
| 3,762,769 A | 10/1973 | Poschl | 297/284 |
| 4,014,422 A | 3/1977 | Morishita | 192/67 |
| 4,136,577 A | 1/1979 | Borgersen | 74/479 |
| 4,153,293 A | 5/1979 | Sheldon | 297/284 |
| 4,156,544 A | 5/1979 | Swenson et al. | 297/284 |
| 4,182,533 A | 1/1980 | Arndt et al. | 297/284 |
| 4,295,681 A | 10/1981 | Gregory | 297/284 |
| 4,313,637 A | 2/1982 | Barley | 297/284 |
| 4,316,631 A | 2/1982 | Lenz et al. | 297/284 |
| 4,354,709 A | 10/1982 | Schuster | 297/284 |
| 4,390,210 A | 6/1983 | Wisniewski et al. | 297/452 |

(Continued)

FOREIGN PATENT DOCUMENTS

| | | |
|---|---|---|
| AT | 401 497 | 9/1996 |
| DE | 2040794 | 7/1971 |
| DE | 206 4419 | 7/1972 |
| DE | 29 47 472 | 8/1980 |
| EP | 0 006 840 B1 | 2/1982 |
| EP | 0 169 293 B1 | 10/1988 |
| EP | 0 322 535 A1 | 7/1989 |
| EP | 0518 830 A1 | 12/1992 |
| EP | 0 485 483 B1 | 1/1994 |
| EP | 0 434 660 B1 | 5/1995 |
| EP | 0 540 481 B1 | 12/1995 |
| EP | 0 662 795 B1 | 12/1996 |
| EP | 0 702 522 B1 | 3/1997 |
| EP | 0 696 251 B1 | 7/1997 |
| EP | 0 746 219 B1 | 11/1998 |
| EP | 0 797 399 B1 | 11/1998 |
| EP | 0 698 360 B1 | 3/2000 |
| FR | 2 596 334 | 10/1987 |
| GB | 1 423 617 | 2/1976 |
| GB | 2 013 487 | 2/1978 |
| RU | 587924 | 2/1978 |
| WO | WO/00/00064 | 1/2000 |

*Primary Examiner*—Peter M. Cuomo
*Assistant Examiner*—Stephen D'Adamo
(74) *Attorney, Agent, or Firm*—Grant D. Kang; Dennis J. M. Donahue, III; Husch & Eppenbeger LLC

(57) ABSTRACT

A scissors lumbar support includes a hinge axle and two arms each having a forward portion and a rearward portion. The forward portions are lumbar support pads. At least one of the rearward portions of the arms are adapted to operatively engage a force applicator. Each of the arms hinge around a hinge axle upon application of force by a force applicator. At least one of the rearward portions of the arms are mountable on a seat frame.

38 Claims, 14 Drawing Sheets

U.S. PATENT DOCUMENTS

| | | |
|---|---|---|
| 4,449,751 A | 5/1984 | Murphy et al. ............. 297/284 |
| 4,452,485 A | 6/1984 | Schuster .................... 297/284 |
| 4,465,317 A | 8/1984 | Schwarz .................... 297/284 |
| 4,494,709 A | 1/1985 | Takada .................... 242/107.6 |
| 4,541,670 A | 9/1985 | Morgenstern et al. ...... 297/284 |
| 4,555,140 A | 11/1985 | Nemoto .................... 297/452 |
| 4,556,251 A | 12/1985 | Takagi ........................ 297/284 |
| 4,561,606 A | 12/1985 | Sakakibara et al. ......... 242/107 |
| 4,564,235 A | 1/1986 | Hatsutta et al. ............. 297/284 |
| 4,565,406 A | 1/1986 | Suzuki ....................... 297/284 |
| 4,576,410 A | 3/1986 | Hattori ...................... 297/284 |
| 4,601,514 A | 7/1986 | Meiller ...................... 297/284 |
| 4,602,819 A | 7/1986 | Morel ........................ 297/460 |
| 4,627,661 A | 12/1986 | Ronnhult et al. ........... 297/284 |
| 4,632,454 A | 12/1986 | Naert ......................... 297/284 |
| 4,676,550 A | 6/1987 | Neve De Mevergnies .. 297/353 |
| 4,679,848 A | 7/1987 | Spierings ................... 297/284 |
| 4,730,871 A | 3/1988 | Sheldon ..................... 297/230 |
| 4,880,271 A | 11/1989 | Graves ....................... 257/284 |
| 4,909,568 A | 3/1990 | Dal Monte ................. 292/284 |
| 4,915,448 A | 4/1990 | Morgenstern ............... 297/284 |
| 4,950,032 A | 8/1990 | Nagasaka .................... 297/284 |
| 4,957,102 A | 9/1990 | Tan et al. ..................... 128/68 |
| 4,968,093 A | 11/1990 | Dal Monte ................. 297/284 |
| 5,005,904 A | 4/1991 | Clemens et al. ............ 297/284 |
| 5,022,709 A | 6/1991 | Marchino ................... 297/452 |
| 5,026,116 A | 6/1991 | Dal Monte ................. 297/284 |
| 5,050,930 A | 9/1991 | Schuster et al. ............ 257/284 |
| 5,076,643 A | 12/1991 | Colasanti et al. ........... 297/284 |
| 5,088,790 A | 2/1992 | Wainwright et al. ........ 297/284 |
| 5,137,329 A | 8/1992 | Neale ......................... 297/284 |
| 5,174,526 A | 12/1992 | Kanigowski ................ 244/122 |
| 5,186,412 A | 2/1993 | Park ........................... 242/245 |
| 5,197,780 A | 3/1993 | Coughlin ................. 297/284.7 |
| 5,215,350 A | 6/1993 | Kato ........................ 297/284.4 |
| 5,217,278 A | 6/1993 | Harrison et al. ......... 297/284.7 |
| 5,286,087 A | 2/1994 | Elton ....................... 297/284.7 |
| 5,299,851 A | 4/1994 | Lin .......................... 297/284.5 |
| 5,335,965 A | 8/1994 | Sessini .................... 297/284.4 |
| 5,385,531 A | 1/1995 | Jover ........................... 601/99 |
| 5,397,164 A | 3/1995 | Schuster .................. 297/284.1 |
| 5,423,593 A | 6/1995 | Nagashima .............. 297/284.5 |
| 5,449,219 A | 9/1995 | Hay et al. ................ 297/284.4 |
| 5,452,868 A | 9/1995 | Kanigowski ............. 244/122 R |
| 5,474,358 A | 12/1995 | Maeyaert ................. 297/284.7 |
| 5,498,063 A | 3/1996 | Schuster et al. ......... 297/284.1 |
| 5,518,294 A | 5/1996 | Ligon, Sr. et al. ....... 297/284.4 |
| 5,553,917 A | 9/1996 | Adat et al. ............. 297/230.14 |
| 5,562,324 A | 10/1996 | Massara et al. .......... 297/284.6 |
| 5,567,010 A | 10/1996 | Sparks .................... 297/284.4 |
| 5,567,011 A | 10/1996 | Sessini .................... 297/284.4 |
| 5,588,703 A | 12/1996 | Itou ........................ 297/284.4 |
| 5,609,394 A | 3/1997 | Ligon, Sr. et al. ....... 297/284.4 |
| 5,626,390 A | 5/1997 | Schuster et al. ......... 297/284.1 |
| 5,638,722 A | 6/1997 | Klingler .................... 74/502.4 |
| 5,651,583 A | 7/1997 | Klingler et al. .......... 297/284.4 |
| 5,651,584 A | 7/1997 | Chenot et al. ........... 297/284.4 |
| 5,704,687 A | 1/1998 | Klingler .................. 297/284.4 |
| 5,718,476 A | 2/1998 | De Pascal et al. ....... 297/284.4 |
| 5,758,925 A | 6/1998 | Schrewe et al. ......... 297/284.6 |
| 5,762,397 A | 6/1998 | Venuto et al. ........... 297/284.4 |
| 5,769,491 A | 6/1998 | Schwarzbich ............ 297/284.4 |
| 5,772,281 A | 6/1998 | Massara .................. 297/284.4 |
| 5,775,773 A | 7/1998 | Schuster et al. ......... 297/284.1 |
| 5,791,733 A | 8/1998 | Van Hekken et al. .... 297/284.4 |
| 5,816,653 A | 10/1998 | Benson .................... 297/284.4 |
| 5,823,620 A | 10/1998 | Le Caz .................... 297/284.4 |
| 5,857,743 A | 1/1999 | Ligon, Sr. et al. ....... 297/284.9 |
| 5,868,466 A | 2/1999 | Massara et al. .......... 297/284.6 |
| 5,884,968 A | 3/1999 | Massara ................ 297/216.12 |
| 5,897,168 A | 4/1999 | Bartelt et al. .......... 297/452.18 |
| 5,911,477 A | 6/1999 | Mundell et al. ......... 297/284.4 |
| 5,913,569 A | 6/1999 | Klingler .................. 297/284.4 |
| 5,934,752 A | 8/1999 | Klingler .................. 297/284.4 |
| 5,975,632 A | 11/1999 | Ginat ...................... 297/284.4 |
| 5,984,407 A | 11/1999 | Ligon, Sr. et al. ....... 297/284.4 |
| 5,988,745 A | 11/1999 | Deceuninck ............. 297/284.4 |
| 6,003,941 A | 12/1999 | Schuster, Sr. et al. ... 297/284.1 |
| 6,007,151 A | 12/1999 | Benson .................... 297/284.4 |
| 6,030,041 A | 2/2000 | Hsiao ...................... 297/284.4 |
| 6,036,265 A | 3/2000 | Cosentino ................ 297/284.4 |
| 6,045,185 A | 4/2000 | Ligon, Sr. et al. ....... 297/284.4 |
| 6,050,641 A | 4/2000 | Benson .................... 297/284.4 |
| 6,074,006 A | 6/2000 | Milosic et al. |
| 6,079,783 A | 6/2000 | Schuster, Sr. et al. ... 297/284.4 |
| 6,089,664 A | 7/2000 | Yoshida |
| 6,092,871 A | 7/2000 | Beaulieu .................. 297/284.4 |
| 6,152,531 A | 11/2000 | Deceuninck ............. 297/284.4 |
| 6,152,532 A | 11/2000 | Cosentino ................ 297/284.4 |
| 6,158,300 A | 12/2000 | Klingler ...................... 74/526 |
| 6,227,617 B1 | 5/2001 | Von Möller ............. 297/284.4 |
| 6,227,618 B1 | 5/2001 | Ligon, Sr. et al. ....... 297/284.4 |
| 6,254,186 B1 | 7/2001 | Falzon ........................ 297/284 |
| 6,254,187 B1 | 7/2001 | Schuster, Sr. et al. ... 297/284.1 |
| 6,270,158 B1 | 8/2001 | Hong ....................... 297/284.4 |
| 6,296,308 B1 | 10/2001 | Cosentino et al. ....... 297/284.4 |
| 6,334,651 B1 | 1/2002 | Duan et al. .............. 297/284.4 |
| 6,619,739 B1 | 9/2003 | McMillen |
| 6,652,026 B1 | 11/2003 | Toyota et al. |
| 6,695,402 B1 | 2/2004 | Sloan, Jr. |

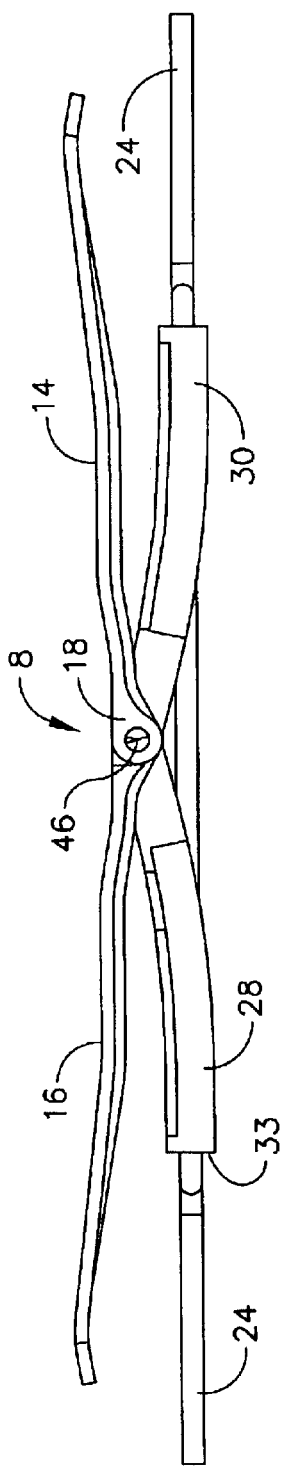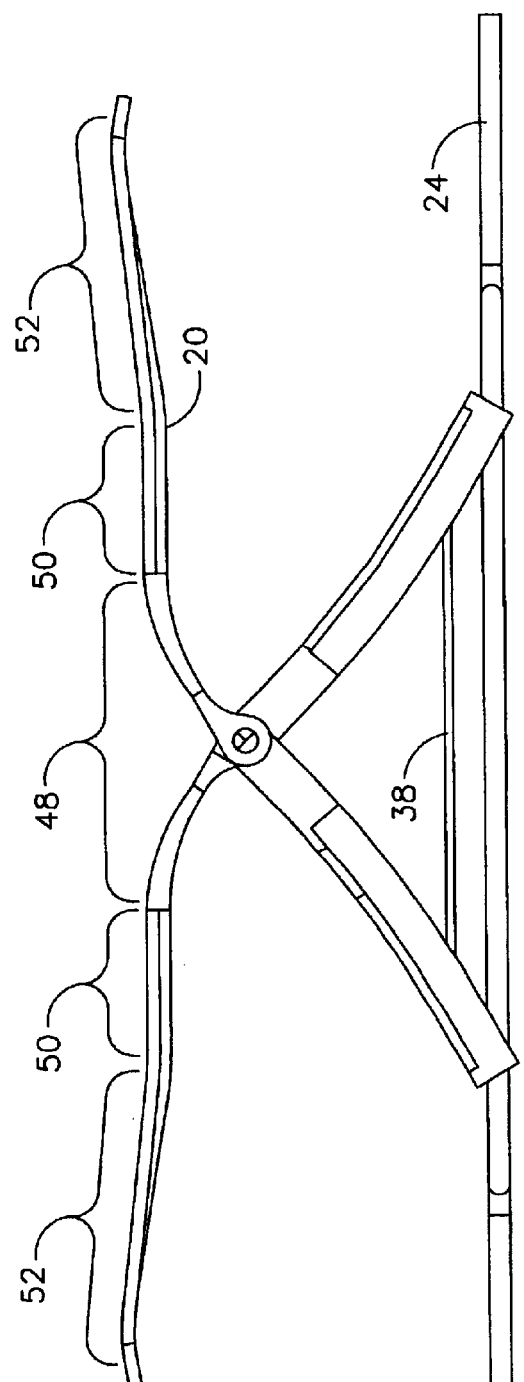
FIG. 5
FIG. 6

METHOD AND APPARATUS FOR A SCISSORS ERGONOMIC SUPPORT

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

This invention relates to ergonomic supports, especially lumbar supports, for seats, particularly for automobile seats.

2. Related Art

Modern seat designs commonly include lumbar supports for the comfort of the person sitting in the seat. In fact, it is becoming more common for seats to incorporate a variety of components for passenger comfort, including heating and cooling ducts and the like. The promulgation of components within the confines of a seat creates a need for smaller, more compact components. Saving space is also served by reducing the number of components required to provide ergonomic support.

It is desirable in designing ergonomic controls for automobile seats to minimize the amount of manual effort a passenger needs to exert to move an ergonomic device such as a lumbar support through its full range of travel. A large number of turns required on a manual hand-crank or lever are undesirable. Generally speaking, prior art combinations of lumbar supports and actuators had a one-to-one ratio of actuator motion relative to lumbar support motion. For example, a traction cable would need to be pulled 10 millimeters in order to move a lumbar support attached to it 10 millimeters closer to a passenger. There is a need in the art for a lumbar support that increases the ratio of pressure surface travel to actuator movement.

It is also desirable for ergonomic devices in automobile seats to be actuated by the lightest, and consequently least expensive, actuator components. Accordingly, it is desirable for a lumbar support configuration to reduce the load on actuators. There is a need for an ergonomic support whose configuration gives mechanical advantage to the actuator, so that lighter and less expensive actuator cables, gears, motors, etc. may be used.

The most common current form of prior art lumbar support is a traction actuated arching basket such as those described in U.S. Pat. No. 5,397,164. This type of lumbar support uses traction to arch a flexible pressure surface towards the passenger by increasing the convexity of the bowed shape of the pressure surface. These pressure surfaces are naturally biased towards a flat position. The natural bias must be overcome by the traction device. Accordingly, there is an additional load that must be overcome by the actuator. In addition to the load created by the weight of the passenger, these prior art lumbar devices have to overcome the load of flexing the pressure surface, and overcome the friction inherent in sliding the moving ends of such arching lumbar supports along their stationary mounts. There is a need in the art for a lumbar support configuration that eliminates unnecessary loads.

Some lumbar supports move up and down in the seat to raise and lower the point of support. Such supports must overcome the friction of moving along the seat cushions. There is a need to eliminate such friction.

Another disadvantage of arching lumbar supports is that as the pressure surface extends farther towards the passenger, the surface area contacting the passenger shrinks, which is less comfortable. The pressure surface also becomes more rigid at its furthest extension, which is also uncomfortable. There is a need for a lumbar support that retains its full effective surface area and flexibility when extended.

Furthermore, in the particular art of supporting the lumbar spine, there is a need for spinal relief. That is, the bony vertebrae of the spine become uncomfortable if direct pressure is applied to them by a lumbar support pressure surface. It is preferable to apply lumbar supporting pressure bilaterally adjacent to the spinal column, while maintaining a vertical recess or channel to accommodate the vertebrae.

As with all auto parts, there is a constant need in seat assembly procedures to increase the economy, speed and efficiency of component assembly and shipping. There is a further need in seat design for strong, economical, compact components.

Producing fewer parts serves these needs. Nevertheless, the device must remain strong and stay robust through many cycles of use.

SUMMARY OF THE INVENTION

The present invention is an ergonomic support, particularly as used for a lumbar support, that acts in a scissors motion. Bilateral lumbar supporting pads have a hinge between them. Each pad has a lever arm that extension to the rear of the hinge, away from the seat occupant. These extending arms are attached to any of a variety of force applying means, for example, a Bowden cable. Traction on the Bowden cable draws the lever arms together, which causes a scissors action through the hinge, causing the forward lumbar supporting pads to extend towards the seat occupant.

The rearward extensions also provide a mount site for installation in a seat frame.

The present invention supports the lumbar spine with pressure surfaces that are generally vertical and located bilaterally adjacent to the vertebra of the spine. The centrally located, vertical hinge creates a channel for relief of pressure on the spinal vertebrae.

The present invention makes the combination of components within a seat more compact, especially with regard to eliminating the bulk and number of components required. It uses a relatively small number of moving parts which are simple in design and movement. The present invention streamlines the manufacture, assembly, packaging and shipping of the device and of seats incorporating the device, lowers production costs and increases the durability and useable life of the device and seats incorporating it. The scissors ergonomic support may be mounted in any of a variety of seat frames and suspension systems.

The scissors lumbar support of the present invention creates an increased ratio of pressure surface travel towards a passenger in relation to the travel required of an actuator linkage, such as a Bowden cable. The pressure surfaces of the scissors lumbar support move out relative to the pivot upon actuation. Also, the pivot itself moves out an additional amount relative to the seat frame because the scissors lumbar support is mounted at the rearward lever arm extensions. A greater than 1-to-1 ratio of pressure surface travel to actuator linkage travel is thereby achieved. Depending upon the length of lever arm extensions, the travel ratio may exceed 2 to 1.

The scissors lumbar support inherently lends mechanical advantage to an actuator. The action of lever arm extensions behind the hinge upon the pressure surfaces ahead of the hinge works as any lever, and multiplies the force applied to the pressure surface by the actuator linked to the rearward lever arm extensions. Accordingly, lighter and less expensive actuators and actuator linkage components, such as Bowden cables, may be used. Moreover, there is substantially less friction in the scissors lumbar support of the present invention than with prior art arching pressure surfaces.

The scissors lumbar support retains the flexibility of its pressure surfaces in its extended position. This is more comfortable for the passenger. It also maintains the full surface area that contacts the passenger.

Another embodiment of the scissors lumbar support is mounted to rock around a horizontal axis in order to raise or lower the apex of support. By rocking instead of sliding, friction between the pressure surface and seat cushions is eliminated.

Further features and advantages of the present invention, as well as the structure and operation of various embodiments of the present invention, are described in detail below with reference to the accompanying drawings.

BRIEF DESCRIPTION OF THE DRAWINGS

FIG. 5 is a schematic top view of the scissors lumbar support in a retracted position.

FIG. 6 is a schematic top view of the scissors lumbar support in an extended position.

DETAILED DESCRIPTION OF THE PREFERRED EMBODIMENTS

Figure 1:
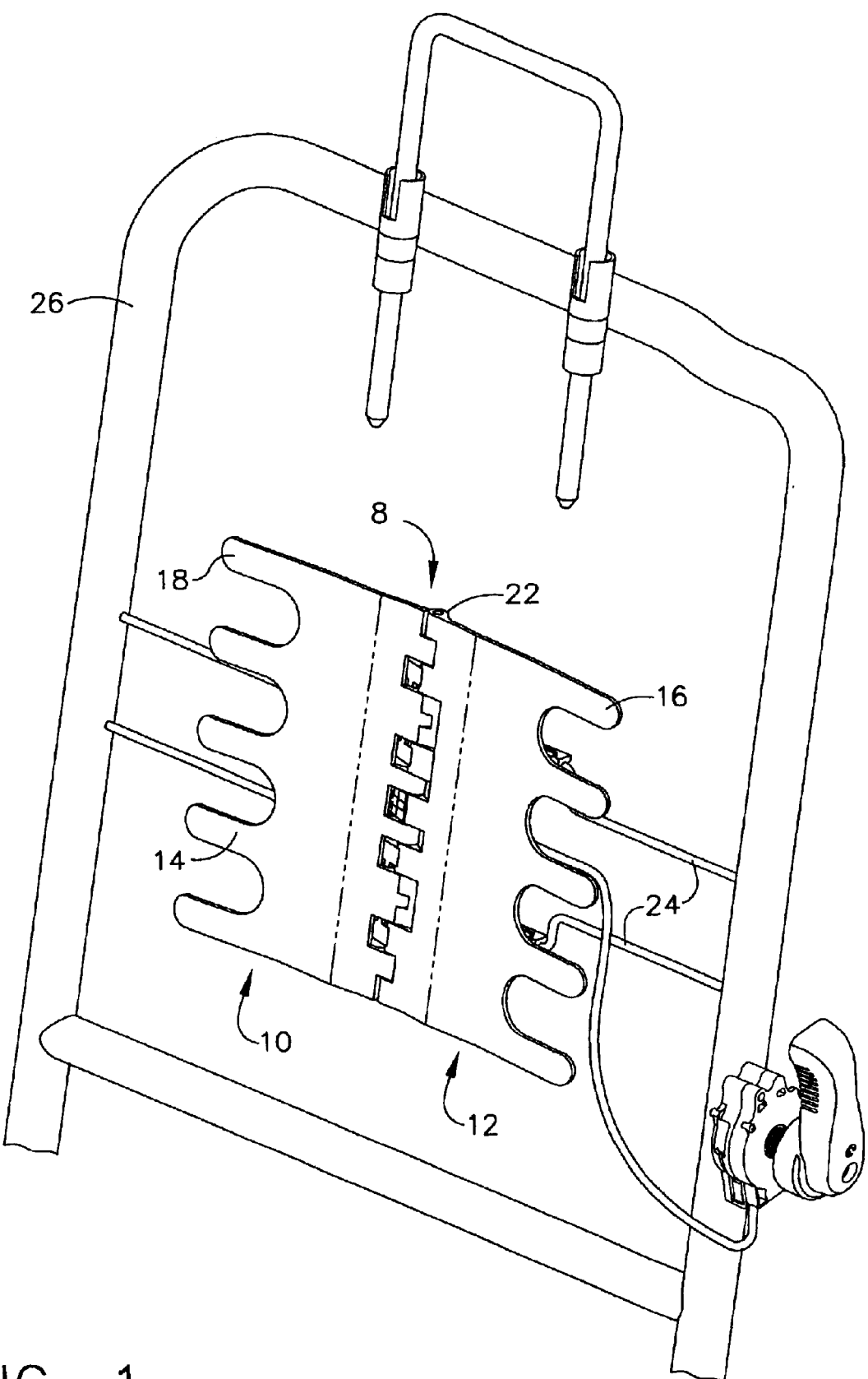
FIG. 1 is a front, perspective view of the scissors lumbar support in a retracted position
Figure 2:
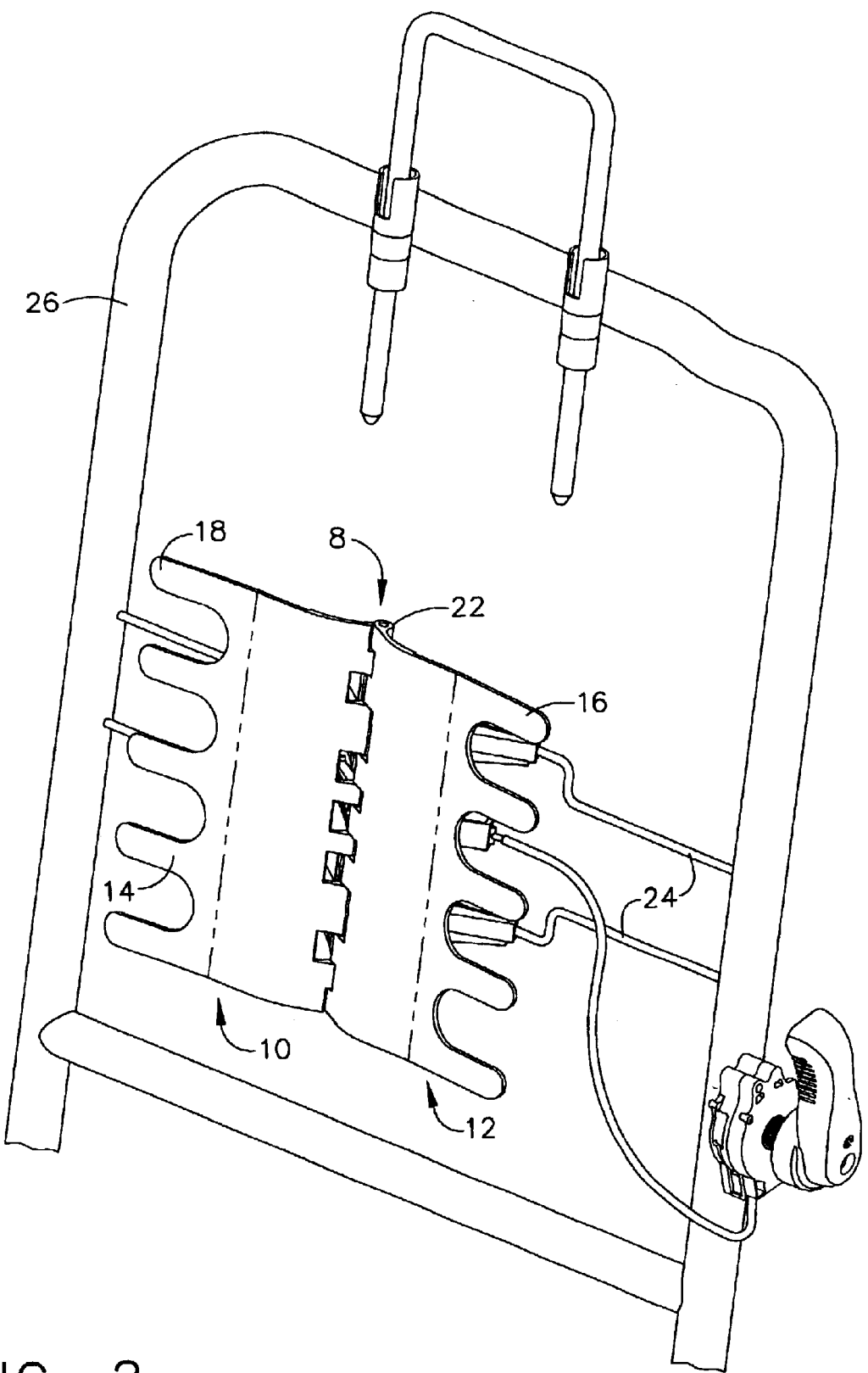
FIG. 2 is a front, perspective view of the lumbar support in an extended position.
Figure 3:
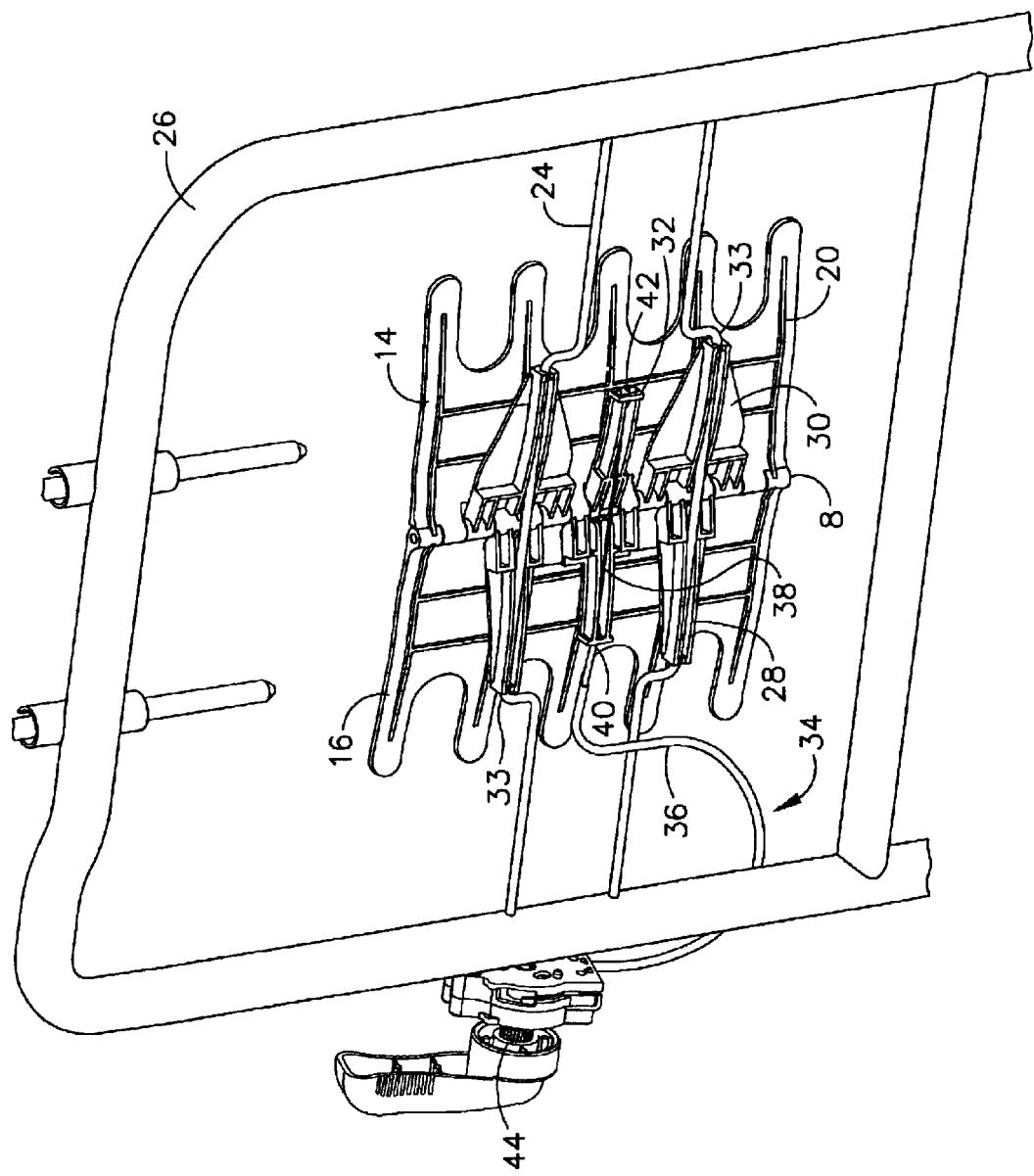
FIG. 3 is a back perspective view of the lumbar support in a retracted position.
Figure 4:
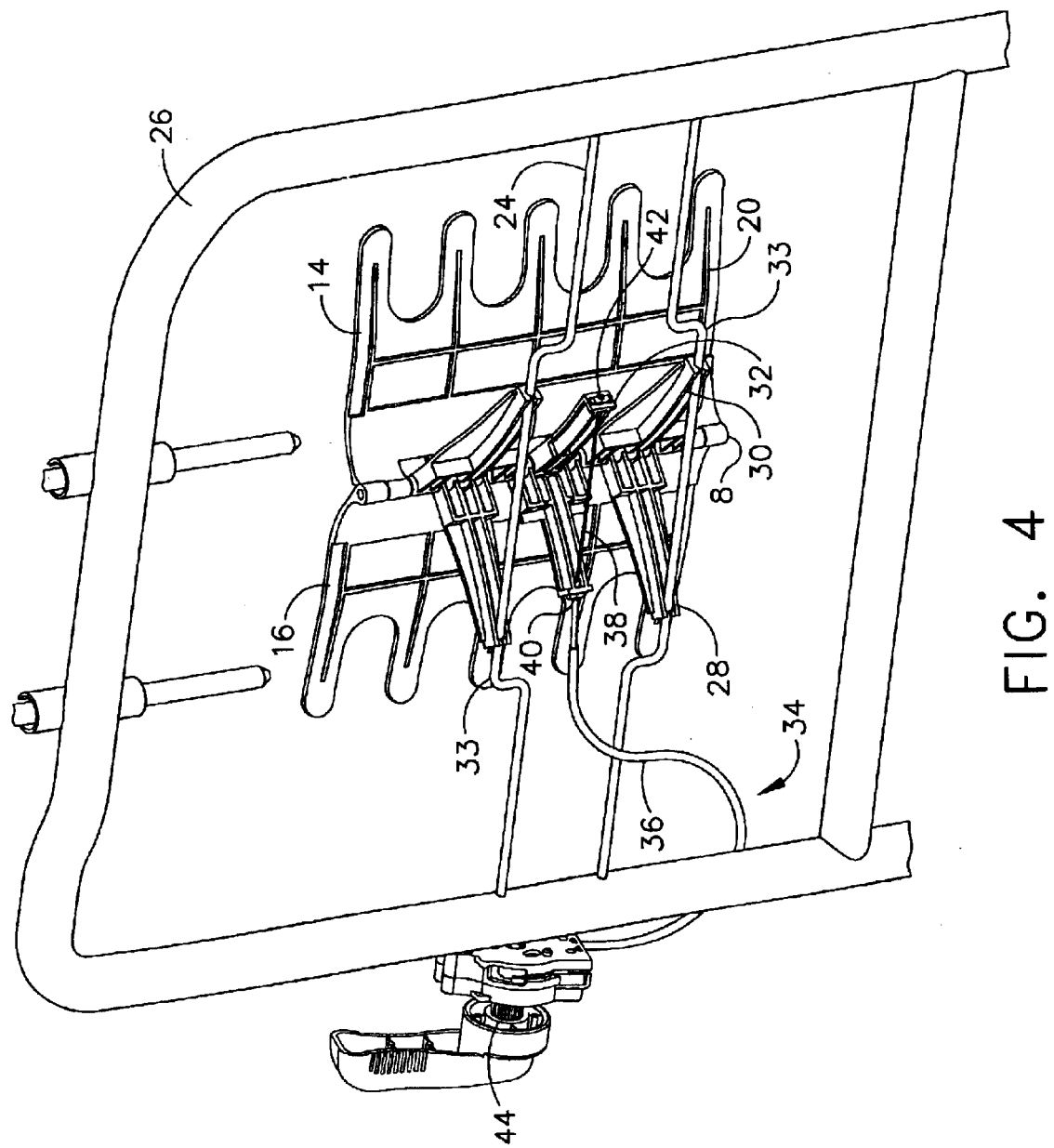
FIG. 4 is a back perspective view of the lumbar support device in an extended position.

Referring to the accompanying drawings in which like reference numbers indicate like elements, FIGS. 1 and 2 are front views of the first embodiment of the scissors lumbar support of the present invention. FIGS. 3 and 4 are back views of the first embodiment and FIGS. 5 and 6 are top views of the first embodiment.

Referring now to FIGS. 1 and 2, the present invention is comprised of two hinging arms, 10 and 12, connected at a vertical hinge, 8. These arms are preferably molded plastic but may be metal. They are deployed in a left handed and right handed fashion. They may be manufactured in left and right handed versions, but preferably are manufactured to be symmetrical. In assembly, in order to create a bilateral hinge support from symmetrical arms, one of the arms is simply inverted to create the mirror image of the other.

Each arm has three portions. A forward extending aspect, 14 and 16, is the lumbar supporting pressure surface or pad. Although the configuration of the forward extending support surface may vary, the lumbar supporting pad, 14 and 16 are preferably curved around a vertical axis and convex towards the seat occupant. It is preferably tapered from its medial to its distal side, and may optionally have ribs 18, or holes to promote flexibility.

The scissors lumbar support will hinge at the medial portions of the arms. In this medial portion of each arm, are at least one, and preferably 2 or more hinge knuckles 22 having vertical through holes. The through holes receive insertion during assembly of a hinge pin (not shown). Caps, bends or other pin end stops hold the components in their assembled configuration.

Mounting wires 24 attach the lumbar support to a seat frame 26.

FIG. 1 shows the lumbar support in its flat, retracted, non-supporting position. FIG. 2 shows the lumbar support in its extended position. It may be placed in intermediate positions.

FIGS. 3 and 4 are back views which depict the flat and the extended positions, respectively. The rearward portion of each arm is one or more lever extensions, 28 and 30. On each lever arm extension 28, 30, is a mount, preferably at the distal end. In the depicted embodiment, the mount of the center lever extensions is simply a slot or notch 32, dimensioned to receive a Bowden cable wire. Bowden cable 34 has a sleeve 36 and a wire 38 slidingly disposed through the central axis of the Bowden cable. In assembly, a sleeve cap 40 is placed adjacent to one slot 32 towards the outside of lever arm extension 28 or 30. Wire 38 is slid into place into the slot 32 and extended to the opposing slot 32 on the other extending lever arm, 30 or 28, where it is also slid into place in the other slot 32. Wire 38 has an arresting end cap 42 holding it in its place in slot 32. The other end of Bowden cable 34 has an actuator 44 for tractively drawing wire 38 into sleeve 36.

In the depicted embodiment, the mounts of the upper and lower lever extensions are the slots or notches 33 dimensioned to receive the mounting wires 24. Ridges 20 may be included to retain strength.

In operation, traction on wire 38 draws wire end cap 42 and lever arm extension 28 or 30 towards Bowden cable sleeve cap 40 and the other lever arm extension 30 or 28. This creates a scissors action through the hinge 8, causing the lumbar support pads, 14 and 16, to extend outward from the plane of the seat, towards the seat occupant, thereby applying lumbar supporting pressure. All of the hinging motion of the arms is forward, because rearward extension is arrested by the mounting wires 24 along which the rearward lever arm extensions 28 and 30 slide on mounts 33.

FIGS. 5 and 6 are top views of the scissors lumbar support in its flat and extended positions, respectively. Rearward lever arm extensions 28 and 30 can be seen in alignment with the mounting wires 24 to which they are attached at mounts 33 and along which they slide upon extension. A hinge pin 46 is depicted joining the two halves of the scissors lumbar support at hinge 8 by its insertion through the vertical through holes of the alternating knuckles 18. Support surfaces 14 and 16 face the seat occupant, who would be towards the top of the page in FIGS. 5 and 6.

FIG. 6 shows all of the same components with the scissors lumbar support in its extended position. Supports surfaces 14 and 16 appear somewhat flattened, as they would be in use. Additionally, Bowden cable wire 38 is visible. FIG. 6 also depicts one of the advantages of the present invention, which is this spinal relief area, 48.

Those who are skilled in the ergonomic arts appreciate that the particular shape of the human anatomy must be accommodated for ergonomic support devices to make the seat occupant comfortable. For lumbar supports, this necessity includes incorporating a gap or indentation in any lumbar support to avoid uncomfortable point pressure on the vertebral process of the spine. Prior art lumbar supports created such a spinal relief gap by machining or molding an indentation into the lumbar support pressure surface. As is evident from FIG. 6, the hinged extension action of the scissors lumbar support automatically creates such an advantageous gap 48 for spinal relief when it is moved from its flat position, as shown in FIG. 5, to its extended position, as shown in FIG. 6.

Comparison of FIGS. 5 and 6 illustrates further advantages of the scissors lumbar support. It is appreciated by those with skill in the art that it is desirable to maximize the outward travel of the lumbar support pressure surface relative to the travel of the Bowden cable wire. This is particularly true for manual actuators which require a user to turn a crank on a manual actuator in order to cause the Bowden cable wire to travel relative to the Bowden cable sleeve, which in turn causes the lumbar support pressure surface to travel towards the seat occupant. It is desirable that the full range of pressure surface travel be achieved with the minimum number of manual actuator turns, for user convenience. Therefore, if the ratio of pressure surface outward travel to manually actuated Bowden cable travel is greater than 1 to 1, it is more convenient for the user.

The scissors lumbar support of the present invention has two mechanisms by which outward travel of the pressure surface is achieved. First, the rotation of the arms 10 and 12 around the hinge 8 extends the pressure surfaces 14 and 16 towards the seat occupant. If the scissors lumbar support was mounted at its hinge, this would be the only mechanism for pressure surface extension. The scissors lumbar support may be alternatively mounted at its hinge, but the preferred embodiment of the scissors lumbar support is mounted not at its hinge, but rather at the ends of the rearward extension arms 28 and 30. When the tension of the Bowden cable wire 38 draws these 2 arms closer together, they slide along the mounting wire 24. This action moves the hinge itself outwards towards the seat occupant. This additional extension mechanism creates a greater than 1 to 1 ratio of outward pressure surface travel to Bowden cable travel. Accordingly, the full extension of the scissors lumbar support pressure surface can be achieved with fewer turns of a manual actuator, making the scissors lumbar support more convenient for a seat occupant's use than prior art lumbar supports.

Another advantage of the scissors lumbar support over the prior art is the flexibility of the pressure surfaces 16 and 14. Distal to the spinal relief area 48 are the contact portions 50 of each pressure surface 14 and 16 that contact the paravertebral region of the seat occupant's lumbar spine. Distal to the pressure surface contact zones 50 are the flex zones 52 which are more flexible than the contact zones 50 of the pressure surfaces. This gradual progression from lesser to greater flexibility is more comfortable for the seat occupant. Greater stiffness and strength may be promoted in the contact zones 50 with reinforcing ridges 20. Greater flexibility in the flex zones 52 may be promoted by designing the flex zone with holes, or ribs.

Figure 7:
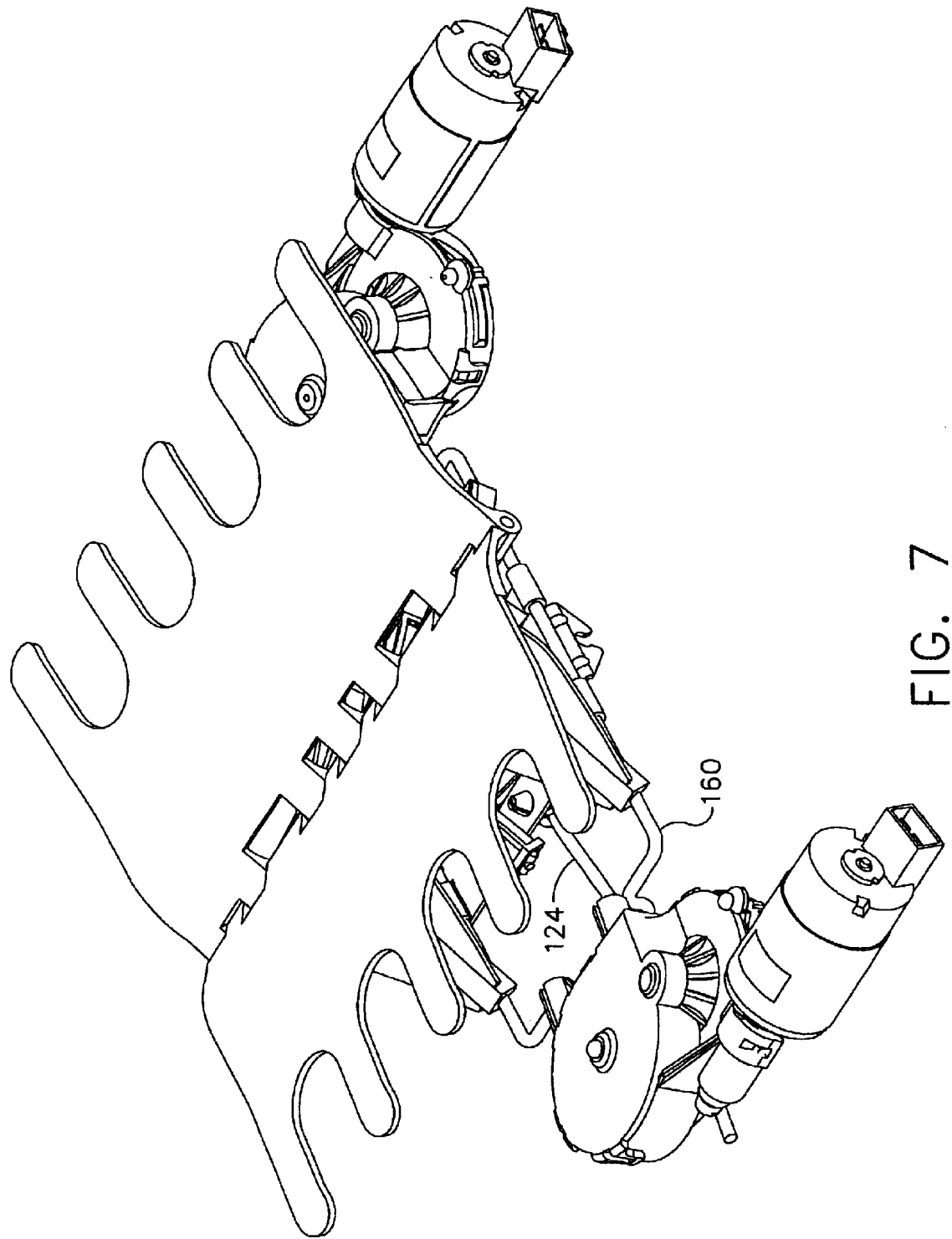
FIG. 7 is a front, perspective view of an alternative embodiment of the scissors lumbar support in an extended position.

FIG. 7 is a front view of a scissors lumbar support incorporating an additional feature enabling the lumbar support to create a high or low lumbar supporting effect. This embodiment of the scissors lumbar support can selectively urge either the lower half or the upper half of the pressure surfaces 14 and 16 towards the seat occupant. This is done by rocking the entire lumbar support assembly up or down.

Figure 8:
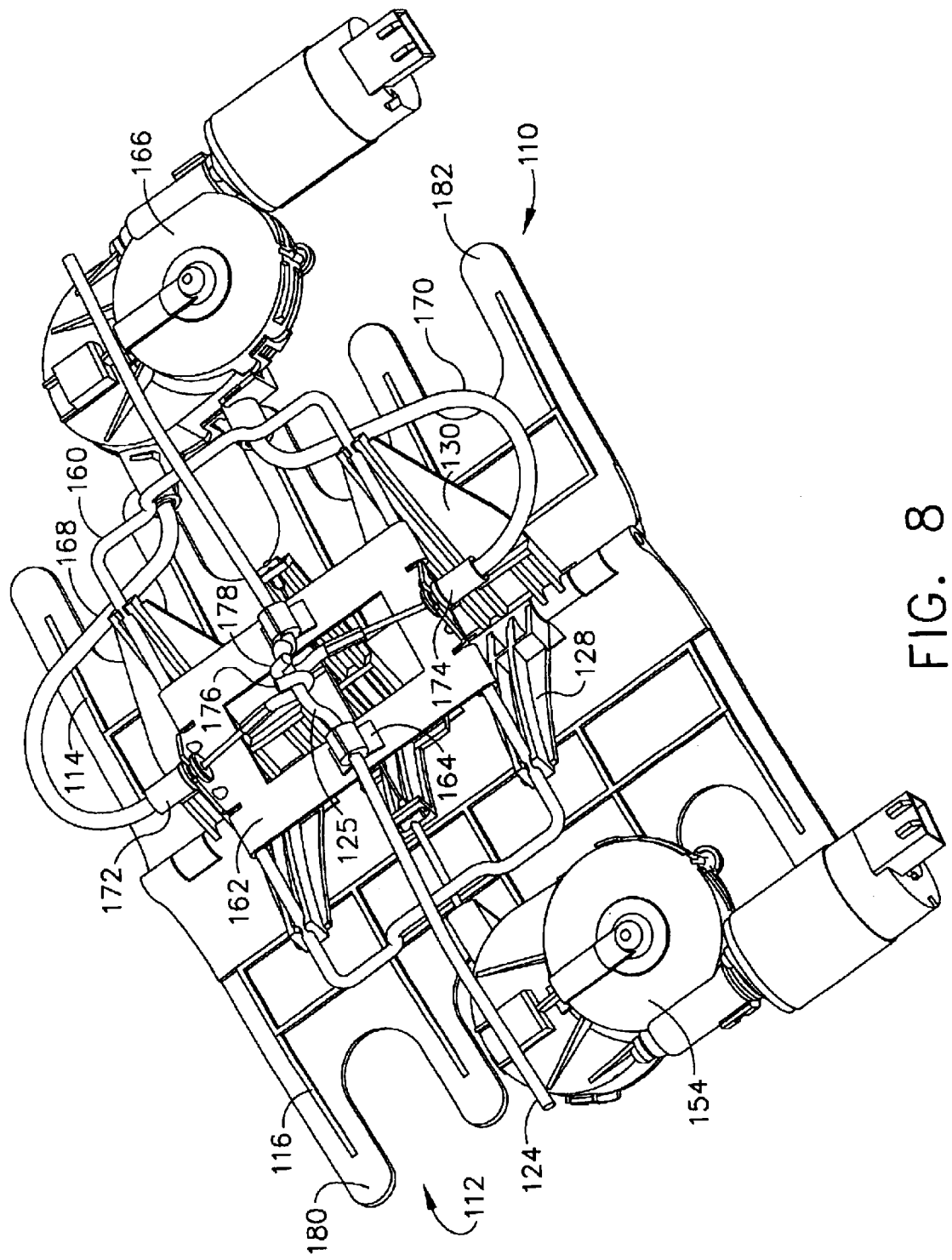
FIG. 8 is a back perspective view of an alternative embodiment of the lumbar support in an extended position.
Figure 9:
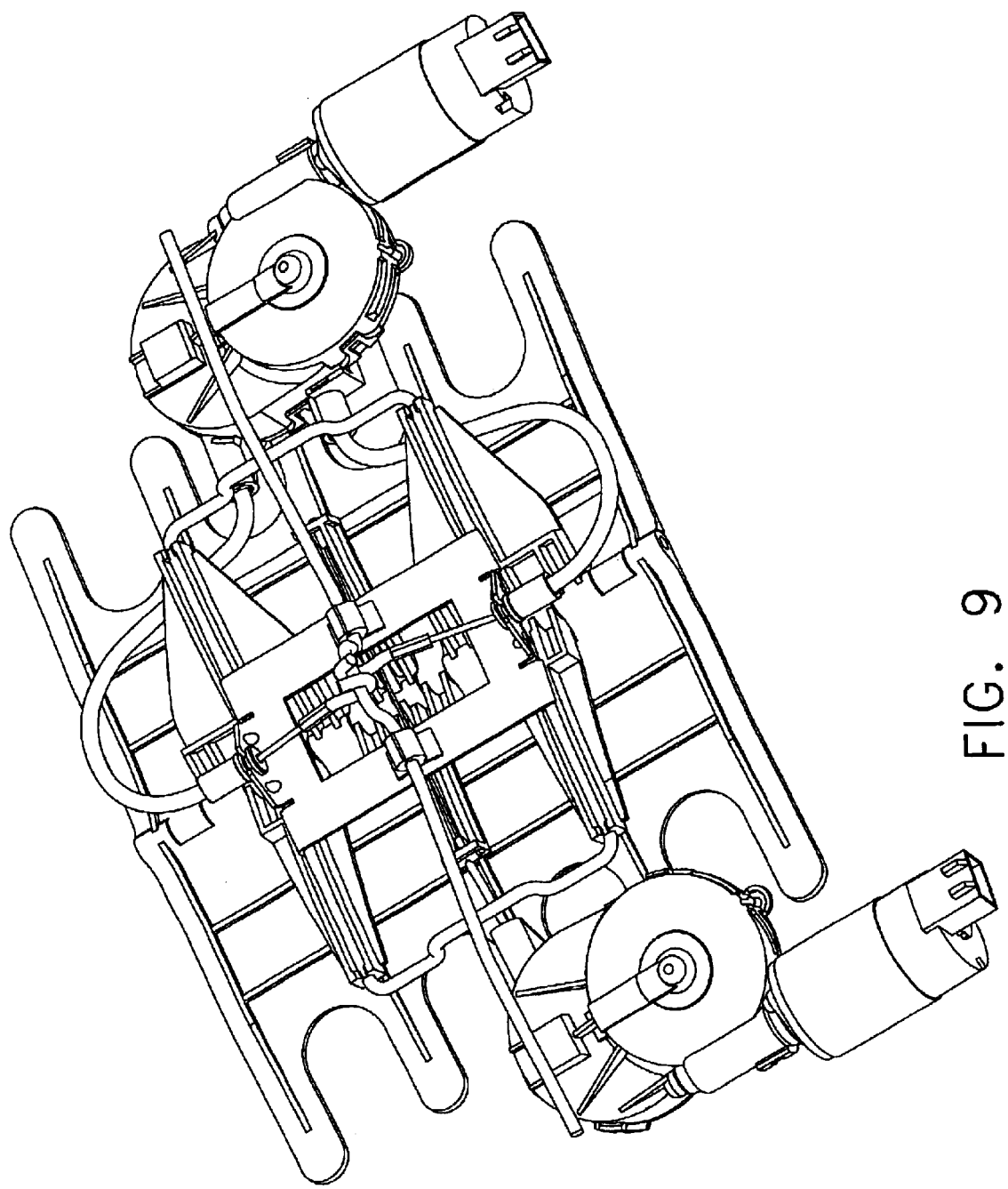
FIG. 9 is a back perspective view of an alternative embodiment of the lumbar support device in a retracted position.

FIGS. 8 and 9, the back view of this embodiment, shows the mechanism for rocking the assembly. In order to rock the bottom portion or the top portion of the pressure surfaces 114 and 116 towards the seat occupant, the assembly pivots on a horizontal rod 124 at or near the vertical midpoint of the lumbar support. Accordingly, there is only one mounting wire, 124. Mounting wire 124 has a central offset 125. The upper and lower lever arm extensions 128 and 130 are mounted on a frame wire 160. Lever arm extensions 128 and 130 slide laterally along frame wire 160 during extension.

The frame wire 160 is in turn mounted on bracket 162. Bracket 162 has pivot mounts 164, by which it is connected to mounting wire 124 such that the frame 162 can pivot on the mounting wire 124.

The embodiment depicted in FIGS. 7 to 9 extends the scissors in the manner described above, but with a power actuator 154.

The rocking motion of the assembly is actuated by a second power actuator 166 in the depicted embodiment, although a manual actuator may be used. Actuator 166 is connected to Bowden cables 168 and 170 such that tightening of one Bowden cable loosens the other. The Bowden cable sleeves are mounted to frame 162 at sleeve end mounts 172 and 174. The Bowden cable wires are mounted with wire hooks 176 and 178. The wires are hooked to the off-set 125 of mounting wire 124. Offset 125 creates a depth-wise diagonal path for the Bowden cable wire. Accordingly, when one of the Bowden cables is tightened, one end of the frame is drawn closer to the off-set 125, drawing that end of the frame 162 towards the rear of the seat. Since the bracket 162 frame wire 160 and lumbar supporting panels 110 and 112 move as a unit, rearward traction on one end of bracket 162 will bias the opposite end of the lumbar support pressure surfaces 114 and 116 towards the seat occupant.

For example, if lower Bowden cable 170 is tightened, lower Bowden cable sleeve mount 174 is drawn closer to off-set 125 in mounting wire 124. This motion will urge the upper most portion 180 of the lumbar support pressure support surfaces 124 and 116 towards the seat occupant. Tightening of the opposite Bowden cable 168 will likewise urge the lower-most portion 182 of the lumbar support pressure surfaces towards the seat occupant.

Figure 10C:
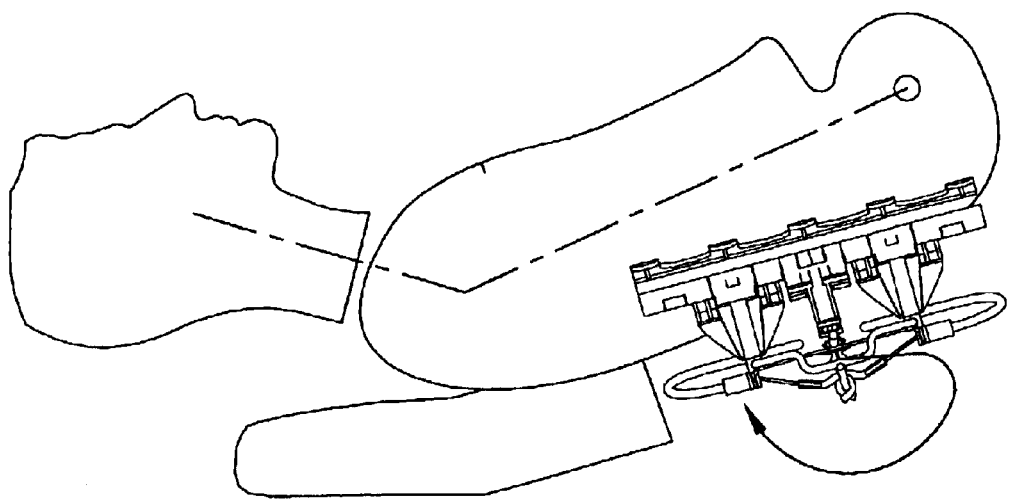
FIGS. 10A, 10B, 10C, 10D, 10E and 10F illustrate the rocking movement of the scissors lumbar support mounted in its second embodiment.
Figure 10B:
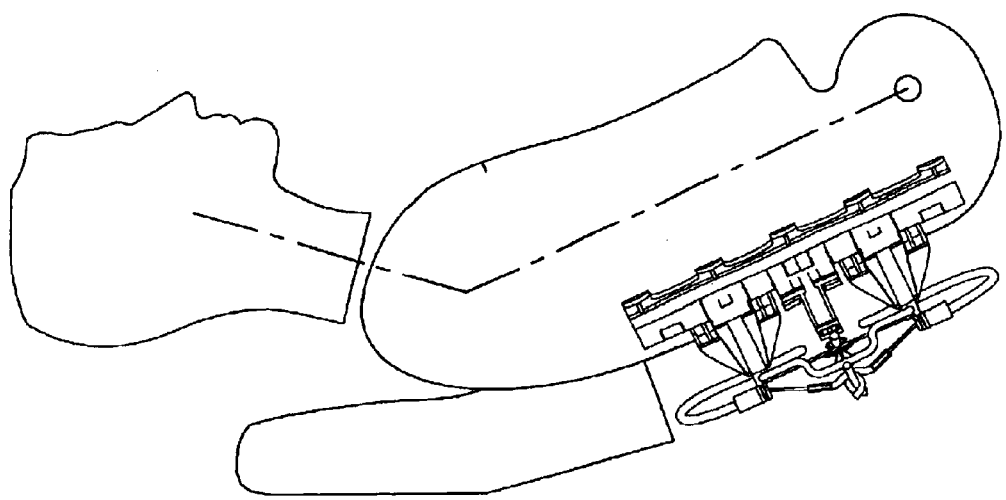
Figure 10A:
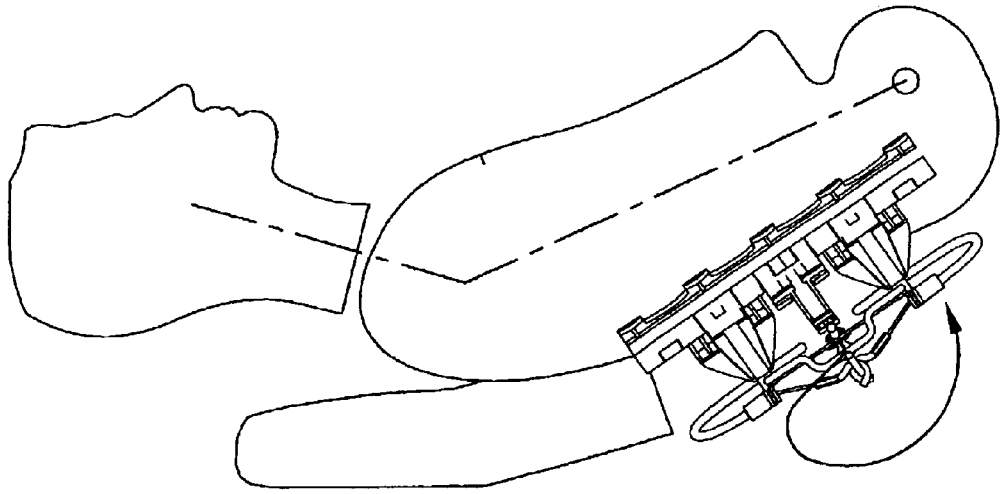
Figure 10F:
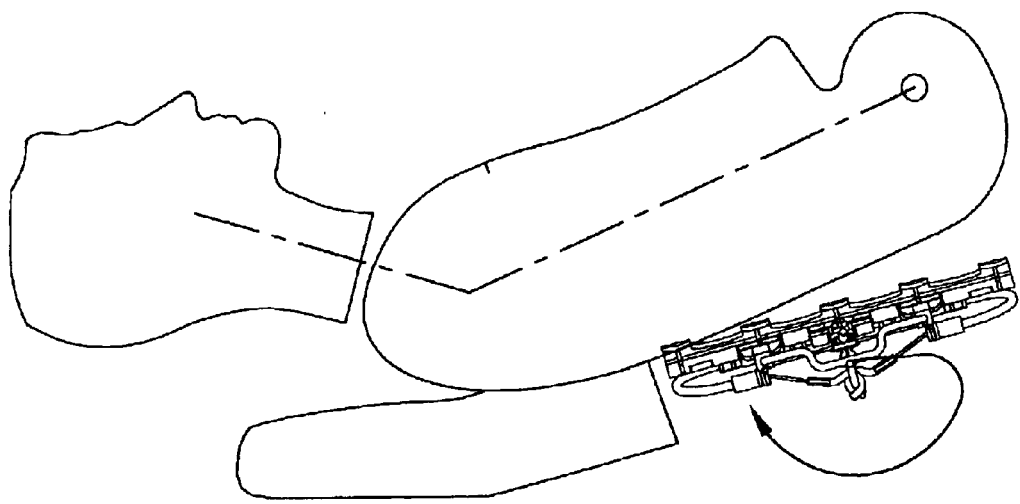
Figure 10E:
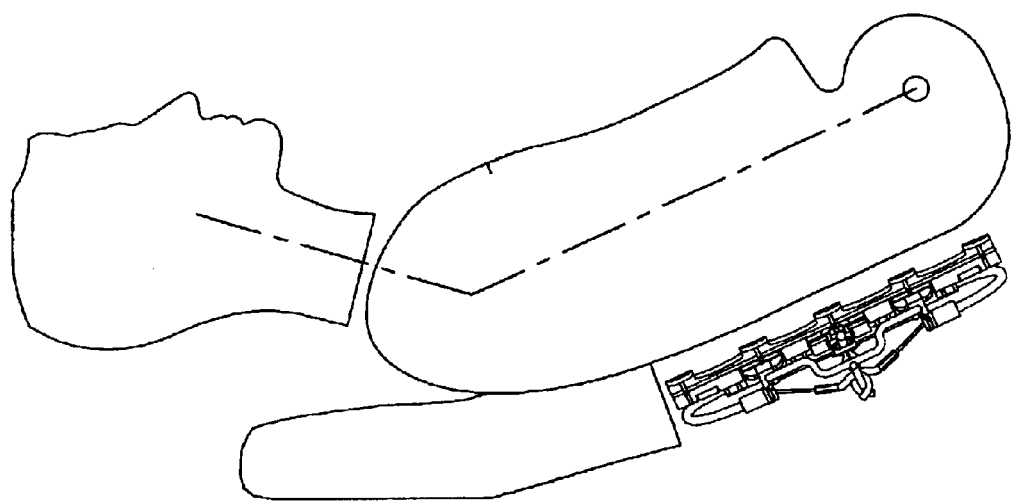
Figure 10D:
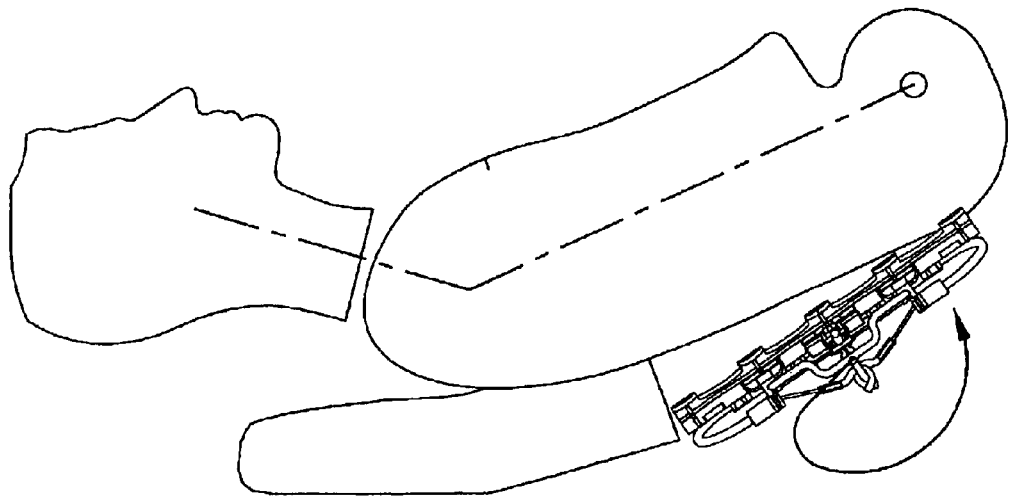

The rotating operation of the assembly is illustrated in FIGS. 10A, 10B, 10C, 10D, 10E and 10F. In FIGS. 10A, 10B and 10C the lumbar support is in its fully extended position. In FIGS. 10D, 10E and 10F the lumbar support is in its fully retracted position. In either position or in any intermediate position the assembly can rock to create a high apex, a low apex or a flatter, intermediate position. In FIG. 10A the assembly has been fully extended and rocked to its low apex position. In FIG. 10B the assembly has been fully extended and remains in its intermediate position. In FIG. 10C the assembly has been fully extended and rocked to its high apex position. In FIG. 10D the assembly has been fully retracted and rocked to its low apex position. In FIG. 10E the assembly has been fully retracted and remains in its intermediate position. In FIG. 10F the assembly has been fully retracted and rocked to its high apex position.

Figure 11A:
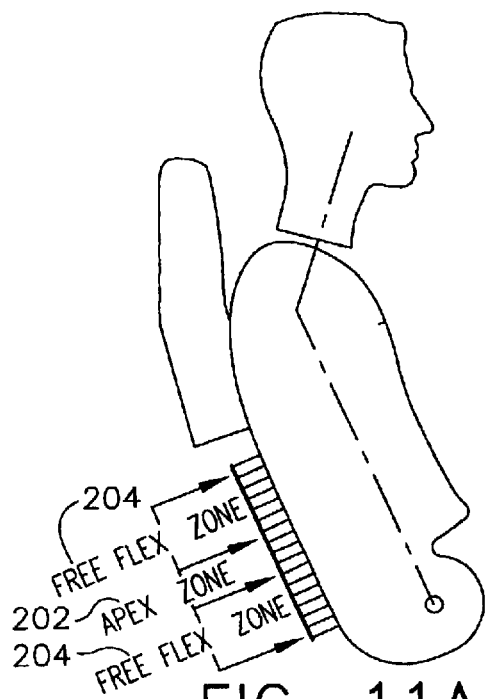
FIG. 11A is a schematic illustration of the flexion of the scissors lumbar support.
Figure 11B:
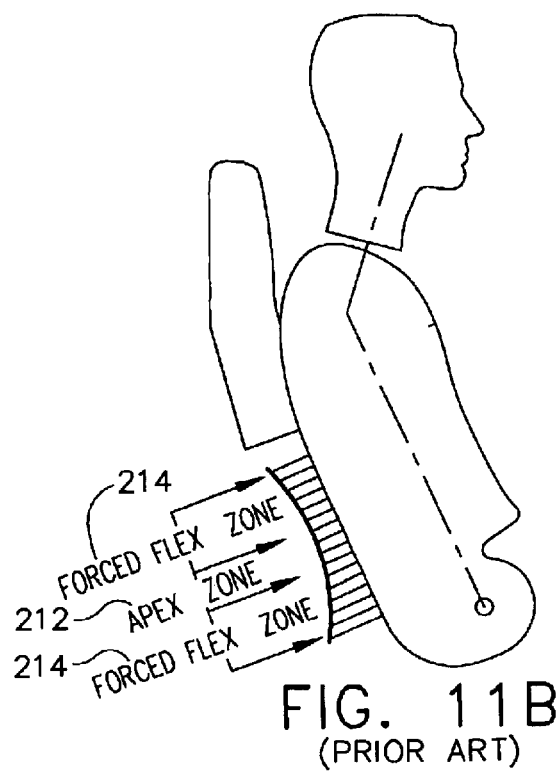
FIG. 11B is a schematic illustration of the flexion of a prior art lumbar support.

Schematic illustrations 11A and 11B illustrate the maintenance of flexion zones upon extension that is achieved by the scissors lumbar support. FIG. 11A shows that the entire support pad surface is advanced towards the seat occupant upon actuation and extension of the lumbar support. Above and below the apex zone 202 are flexion zones 204. Because the mechanism of the scissors lumbar support does not require the application of force to the upper and lower ends of the pressure surface, the flexion zones 204 are advanced towards the seat occupant co-extensively with the apex 202. Empirical studies have demonstrated that such flexion zones increase passenger comfort. By contrast, FIG. 11B illustrates the prior art arching basket-type lumbar support in operation. With the prior art lumbar support, the flexion zones 214 are encapsulated by the tensioning mechanism of the lumbar support, and unable to advance towards the seat occupant as the apex zone 212 advances. Accordingly, there is a loss of flexion zones. Also, the apex zone 212 on prior art lumbar supports becomes increasingly rigid upon extension, thereby further diminishing the comfort of the passenger.

Figure 12A:
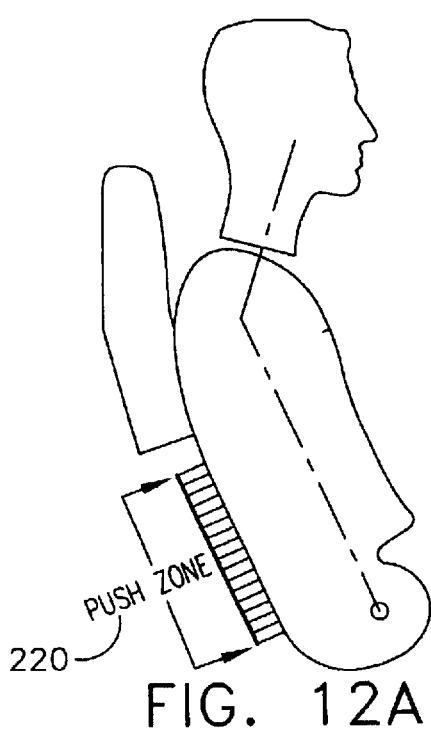
FIG. 12A is a schematic illustration of the pressure surface area maintenance of the scissors lumbar support.
Figure 12B:
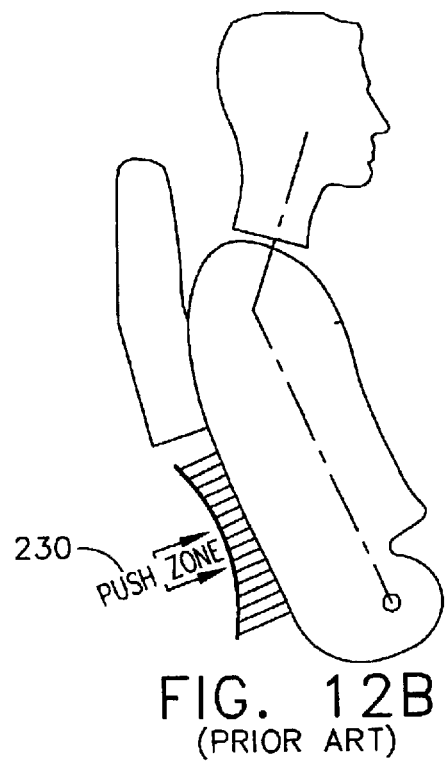
FIG. 12B is a schematic illustration of the pressure surface maintenance of prior art lumbar supports.

FIGS. 12A and 12B illustrate the advantageous maintenance of full pressure zone height that is achieved with the scissors lumbar support. Because the entire pressure surface is advanced towards the passenger upon extension of the scissors lumbar support, the push zone 220 does not lose any height as it is extended further towards the passenger. By contrast, FIG. 13B illustrates that the push zone 230 of prior art lumbar supports decreases vertically with further advancement of the lumbar support. Accordingly, the scissors lumbar support is more comfortable than the prior art supports.

Figure 13:
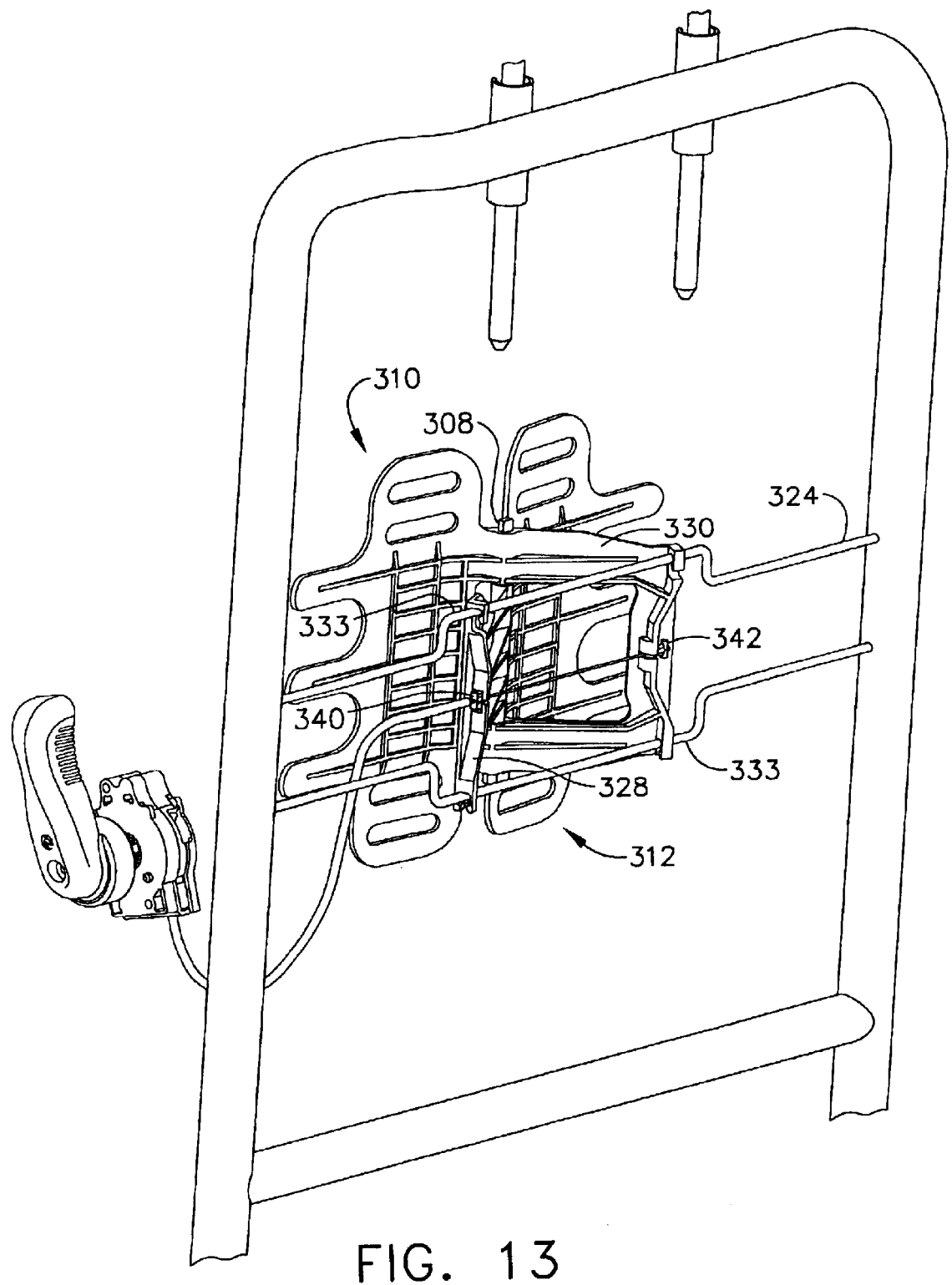
FIG. 13 is a back perspective view of an embodiment of the scissors lumbar support in a two way manual configuration.
Figure 14:
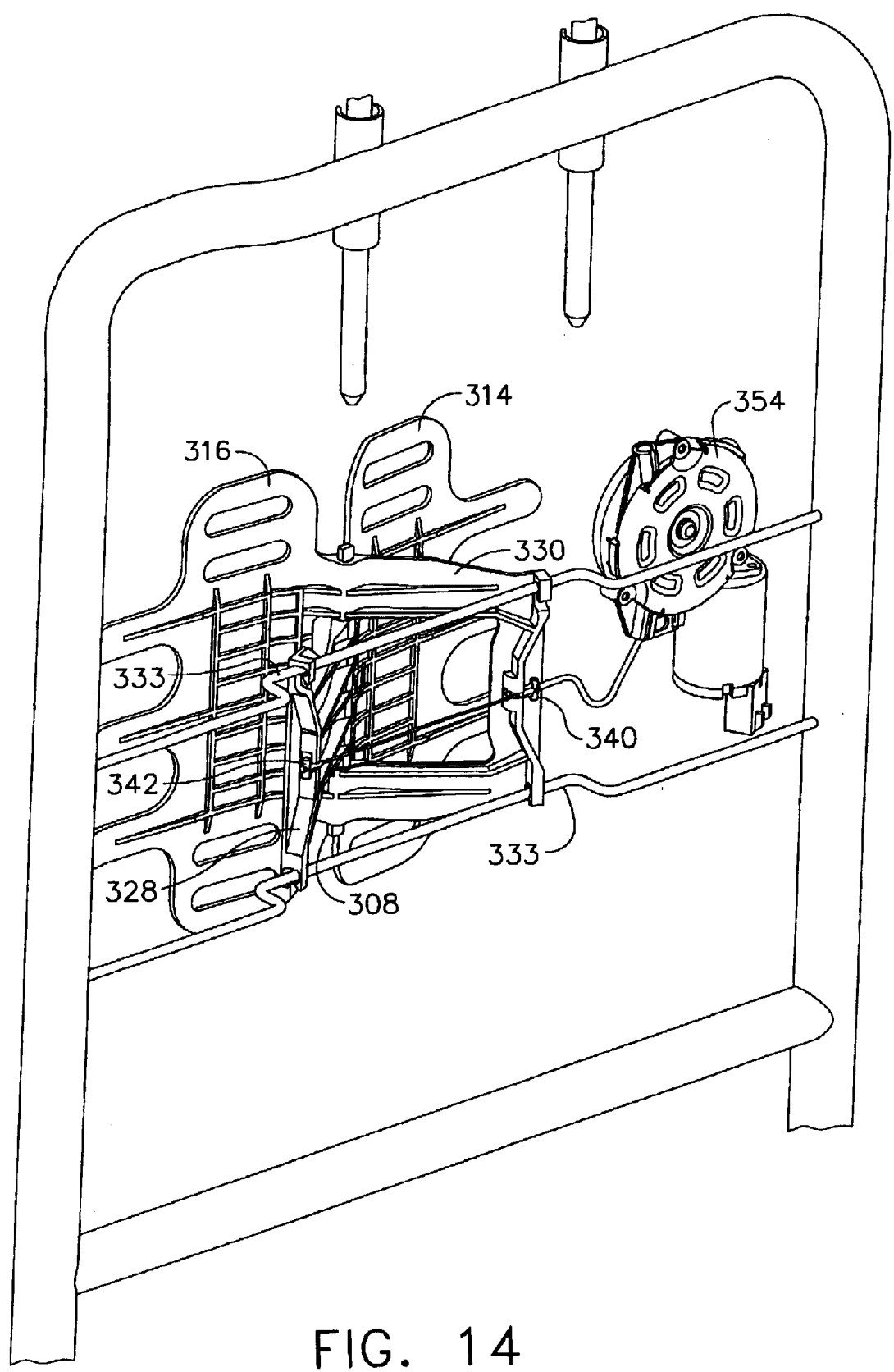
FIG. 14 is a back perspective view of an alternative embodiment of the scissors lumbar support in a two way power configuration, in an extended position.
Figure 15:
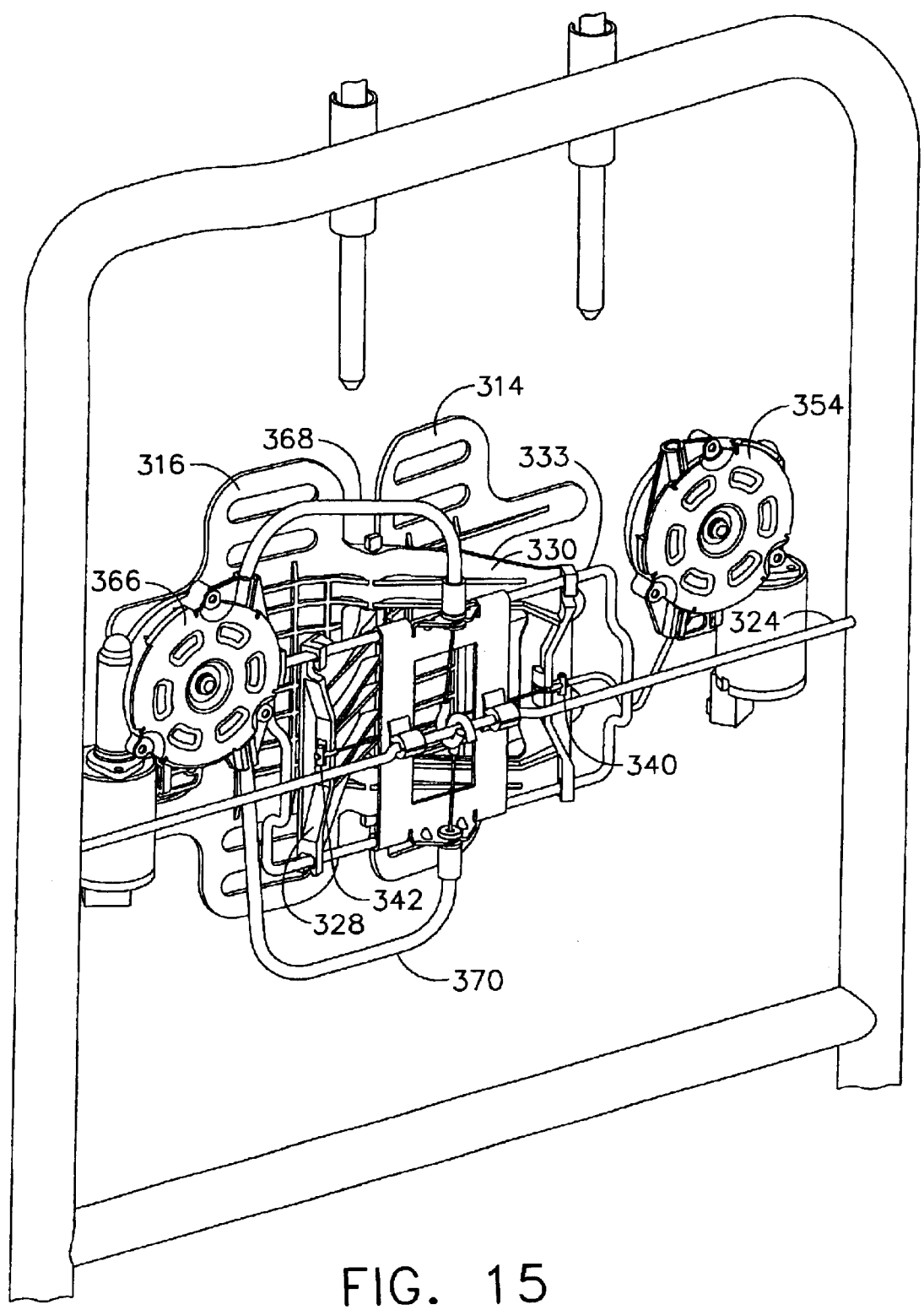
FIG. 15 is a back perspective view of an alternative embodiment of the scissors lumbar support in a four way power configuration.

FIGS. 13, 14 and 15 show another embodiment of the scissors lumbar support in three different configurations. In this alternative embodiment, the shape of the lumbar supporting panels 310 and 312 has been changed. As is evident from these figures when compared to the earlier figures a broad variety of shapes are available for use as lumbar supporting panels without departing from the scope of the present invention. In the currently depicted embodiment the pressure surfaces 314 and 316 normally function in the manner previously described, as does hinge 308.

In the alternative embodiment depicted in 13, 14 and 15, the lever arm extensions 328 and 330 are unified to promote strength. FIG. 13, a single, wide extension 328 supports both the Bowden cable sleeve mount 340 and two sliding mounts 333 for mounting the assembly on two guide wires 324. The complementary lever arm extension 330 is a U-shaped member having a single vertical web joining two upper and lower extension so that it too supports not only sliding mounts 333 for movement along guide rails 324, but also the Bowden cable wire mount 42. The sleeve mount 340 and wire mount 342 may be interchanged, as depicted in FIG. 14.

In FIG. 14 the same alternative embodiment is used in a configuration employing a power actuator 354 to cause the scissors action of the lumbar support. In FIG. 15 the same alternative embodiment is employed in a power configuration depicted in FIG. 8 wherein the unit may be tilted on the horizontal axis of guide rail 324 to create either a higher or lower lumbar support. In both FIGS. 14 and 15, the engagement and operation of the actuators and Bowden cable with the scissors lumbar support is as previously described.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An ergonomic support for a pressure zone, comprising:
   a hinge;
   an upper pair of levers connected through said hinge;
   a lower pair of levers connected through said hinge;
   a pair of pressure surfaces respectively connected to said upper and lower pair of levers at said hinge, wherein each of said pressure surfaces comprises an upper portion and a lower portion spanning from said upper pair of levers to said lower pair of levers; and
   an actuator engaged with at least one of said pair of levers.

2. The ergonomic support of claim 1, further comprising a pair of center lever arms, said actuator engaged with said pair of center lever arms.

3. The ergonomic support of claim 1, wherein at least one of said upper pair of lever arms and at least one of said lower pair of lever arms forms a u-shape and a lever arm with an attachment for said actuator.

4. The ergonomic support of claim 1, wherein each one of said pair of pressure surfaces further comprises a flexible zone at a distal end thereof.

5. The ergonomic support of claim 1, further comprising a pair of spaced apart guide wires, wherein said upper pair of levers slidingly engage one of said guide wires and wherein said lower pair of levers slidingly engage another of said guide wires.

6. The ergonomic support of claim 1, wherein said actuator moves said pair of pressure surfaces from a flattened position to an extended position, said extended position comprising a spinal relief gap between said pair of pressure surfaces.

7. The ergonomic support of claim 1, wherein said hinge further comprises an upper hinge portion connecting said upper pair of levers and a lower hinge portion connecting said lower pair of levers.

8. The ergonomic support of claim 1, wherein at least one of said pair of levers further comprises a pair of mounts and said actuator further comprises a Bowden cable with a sleeve connected to one of said mounts and a wire connected to another of said mounts.

9. An ergonomic support comprising:
a hinge;
a pair of levers connected through said hinge;
a pair of pressure surfaces respectively connected to said pair of levers at a contact zone and extending distally to a flexible zone; and
an actuator comprising a Bowden cable with a sleeve connected to one of said levers and a wire connected to another of said levers, wherein said actuator rotates said pair of levers and moves said pair of pressure surfaces from a flattened position to an extended position, said extended position comprising a spinal relief gap between said pair of pressure surfaces.

10. The ergonomic support of claim 9, wherein each of said levers is selected from the group of extensions consisting of a pair of upper and lower levers, a center lever, a lever with an attachment for said actuator, a u-shaped lever, and any combination thereof.

11. The ergonomic support of claim 9, further comprising a mounting assembly operatively connected to said pair of levers.

12. A scissors ergonomic support comprising:
means for disposing first and second blades on a hinge axle such that ergonomic support faces of said blades may move in a scissors action around said hinge axle;
means for mounting a portion of each of said blades to a mounting assembly, said portions of each of said blades being rearward of said hinge axle relative to a seat occupant; and
means for applying force to said blades to cause said scissors action whereby ergonomic support portions of said blades are extended towards the seat occupant.

13. A method of assembling an ergonomic support comprising:
disposing two blades on a hinge axle such that said blades are opposed and may move in a scissors action, said blades each having an ergonomic support face and a force application portion;
engaging said force application portions of said blades with a mounting assembly adapted to mount on a seat frame; and
attaching a force application element to said force application portions of said blades such that force applied by said force application element moves said blades in said scissors action, whereby said ergonomic support portions of said blades extend towards a seat occupant.

14. A scissors ergonomic support comprising:
a mounting assembly adapted to mount on a seat frame;
a hinge axle;
a first blade and a second blade, each having an ergonomic support face, a force application portion and a hinging portion;
said hinging portions of said first blade and second blade opposingly engaging said hinge axle such that said first blade and second blade move in a scissors action when a force is applied;
said force application portions of said first blade and said second blade being mounted on said mounting assembly so as to translate upon said mounting assembly when a force causes said scissors action; and
a force applicator engaged with at least one of said force application portions of said blades such that applied force causes said scissors action.

15. The scissors ergonomic support of claim 14 wherein said force applicator is a Bowden cable having a sleeve and a wire, said wire being slidingly disposed coaxially within said sleeve, each of said sleeve and said wire having a first end and a second end;
said first end of said wire being operatively engaged with said force application portion of one of said blades;
said first end of said sleeve being operatively engaged with said force application portion of the other of said blades; and
said second ends of said sleeve and said wire being operatively engaged with an actuator;
whereby traction on said Bowden cable draws together said force application portions of said blades, causing said scissors action of said blades, thereby extending said ergonomic support portions of said blades towards a seat occupant.

16. The scissors ergonomic support of claim 14, wherein said force applicator is manually powered.

17. The scissors ergonomic support of claim 14, wherein said force applicator is powered by an electric motor.

18. The scissors ergonomic support of claim 14, wherein said force applicator is tractive.

19. The scissors ergonomic support of claim 14, wherein said force applicator is compressive.

20. The scissors ergonomic support of claim 14, wherein said hinge axle is between said ergonomic support portion and said force application portion on each of said blades.

21. The scissors ergonomic support of claim 14, wherein said hinge axle is substantially vertical.

22. The scissors ergonomic support of claim 14, wherein said ergonomic support portions are flexible.

23. The scissors ergonomic support of claim 14, wherein said ergonomic support portions are lumbar supports.

24. The scissors ergonomic support of claim 14, wherein said ergonomic support portions extend beyond the height of said hinge axle.

25. The scissors ergonomic support of claim 14, wherein said hinge portions of said blades are interleaved.

26. The scissors ergonomic support of claim 14, wherein said force application portions of said blades are asymmetrical and complementary.

27. The scissors ergonomic support of claim 14, further comprising:
a pivot bracket engaged with said mounting assembly, such that said pivot bracket pivots around a substantially horizontal axis;
said force application portions being engaged with said pivot bracket so as to translate upon said pivot bracket when a force causes said scissors action;
a second force applicator engaged with said pivot bracket and with said mounting assembly such that force applied through said second force applicator in a first direction advances a higher area of said ergonomic support portions toward the seat occupant and force applied through said second force applicator in a second direction advances a lower area of said ergonomic support portion toward the seat occupant.

28. The scissors ergonomic support of claim 27, wherein said second force applicator is powered by an electric motor.

29. The scissors ergonomic support of claim 27, wherein said second force applicator is tractive.

30. The scissors ergonomic support of claim 27, wherein said mounting assembly is a horizontal rod element having an offset section, and wherein said second force applicator is comprised of a first traction cable having a first wire disposed to slide axially in a first sleeve, with a first sleeve end attached to a top portion of said bracket and a first wire end attached to said offset in said horizontal rod element, and wherein said second force applicator is further comprised of a second traction cable having a second wire disposed to slide axially in a second sleeve, with a second sleeve end attached to a bottom portion of said bracket and a second wire end attached to said offset in said horizontal rod element.

31. An ergonomic support comprising:
- a first blade having a first upper portion and a first lower portion and comprising a first pressure surface extending between said first upper portion and said first lower portion, a first lever arm connected to said first pressure surface, and a first hinge portion disposed between said first pressure surface and said first lever arm;
- a second blade having a second upper portion and a second lower portion and comprising a second pressure surface extending between said second upper portion and said second lower portion, a second lever arm connected to said second pressure surface, and a second hinge portion disposed between said second pressure surface and said second lever arm;
- a hinge pin connecting said first blade to said second blade through said first hinge portion and said second hinge portion; and
- an actuator operatively connected to at least one of said first lever arm and said second lever arm.

32. The ergonomic support of claim 31, wherein each of said lever arms is selected from the group of extensions consisting of a pair of upper and lower levers, a center lever, a lever with an attachment for said actuator, a u-shaped lever, and any combination thereof.

33. The ergonomic support of claim 31, wherein said first pressure surface is integral with said first blade and said second pressure surface is integral with said second blade.

34. The ergonomic support of claim 31, wherein said actuator moves said first blade and said second blade from a flattened position to an extended position, said actuator rotating said first blade and said second blade relative to said hinge pin.

35. The ergonomic support of claim 31, wherein said first hinge portion, said second hinge portion and said hinge pin form a hinge axle.

36. The ergonomic support of claim 35, wherein said mounting assembly comprises a pair of spaced apart guide wires and wherein said lever arms slidingly engage said guide wires.

37. The ergonomic support of claim 31, further comprising a mounting assembly operatively connected to at least one of said first blade and said second blade.

38. The ergonomic support of claim 37, wherein said extended position comprises a spinal relief gap between said first pressure surface and said second pressure surface and extending from said upper portions to said lower portions along said first hinge portion and said second hinge portion.

* * * * *